United States Patent
Santhar et al.

(10) Patent No.: US 12,019,767 B2
(45) Date of Patent: Jun. 25, 2024

(54) IMAGE ENCRYPTION

(71) Applicant: INTERNATIONAL BUSINESS MACHINES CORPORATION, Armonk, NY (US)

(72) Inventors: Sathya Santhar, Santhar (IN); Sridevi Kannan, Chennai (IN); Sarbajit K. Rakshit, Kolkata (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 17/715,472

(22) Filed: Apr. 7, 2022

(65) Prior Publication Data

US 2023/0325515 A1    Oct. 12, 2023

(51) Int. Cl.
G06F 21/60    (2013.01)
G06T 3/40    (2006.01)
G06T 11/00    (2006.01)

(52) U.S. Cl.
CPC .............. *G06F 21/602* (2013.01); *G06T 3/40* (2013.01); *G06T 11/00* (2013.01)

(58) Field of Classification Search
None
See application file for complete search history.

(56) References Cited

U.S. PATENT DOCUMENTS

| 5,898,779 A | 4/1999 | Squilla | |
|---|---|---|---|
| 2010/0067706 A1* | 3/2010 | Anan | H04L 9/0825 380/28 |
| 2016/0330492 A1 | 11/2016 | Eguchi | |
| 2018/2787971 | 9/2018 | Lu | |
| 2021/0142524 A1 | 5/2021 | Djelouah | |

(Continued)

FOREIGN PATENT DOCUMENTS

| CN | 104680077 A | 6/2015 |
| CN | 112311954 A | 2/2021 |
| CN | 112351151 A | 2/2021 |

(Continued)

OTHER PUBLICATIONS

Azeem et al., "A Unified Framework for Encryption and Decryption of Images Based on Autoencoder (UFED)", vol. 10, No. 3, Mar.-Jun. 2021, International Journal of Advanced Trends in Computer Science and Engineering, 8 pps., <https://www.academia.edu/49204500/A_Unified_Framework_for_Encryption_and_Decryption_of_Images_Based_on_Autoencoder_UFED_>.

(Continued)

*Primary Examiner* — Fatoumata Traore
(74) *Attorney, Agent, or Firm* — David K. Mattheis

(57) ABSTRACT

Image data encryption by receiving first image data corresponding to a first image having a first image size, compressing the first image data, yielding second image data corresponding to a second image having a second image size, augmenting the second image data yielding third image data corresponding to a third image having the first image size, determining coordinates of a location of the second image within the third image, encrypting the third image data according to the coordinates, providing the encrypted third image data to a decoder by a first communications channel, and providing the coordinates of the second image within the third image to the decoder by a second communications channel.

20 Claims, 4 Drawing Sheets

(56) References Cited

U.S. PATENT DOCUMENTS

2022/0319076 A1* 10/2022 Milne .................. G06T 11/001

FOREIGN PATENT DOCUMENTS

| CN | 114240724 A | 3/2022 |
|---|---|---|
| JP | 2010021931 A | 1/2010 |

OTHER PUBLICATIONS

Chenghlu et al., "Cy: Chaotic yolo for user intended image encryption and sharing in social media", Information Sciences, vol. 542, Jan. 4, 2021, pp. 212-227, <https://thesai.org/Publications/ViewPaper?Volume=12&Issue=7&Code=IJACSA&SerialNo=54>.

Duan et al., "Efficient image encryption and compression based on a VAE generative model", Journal of Real-Time Image Processing, 8 pps., Received: May 8, 2018 / Accepted: Sep. 20, 2018, <https://link.springer.com/article/10.1007/s11554-018-0826-4>.

Hu et al., "Research Article Batch Image Encryption Using Generated Deep Features Based on Stacked Autoencoder Network", 13 pps., Hindawi Mathematical Problems in Engineering, vol. 2017, Article ID 3675459, <https://www.hindawi.com/journals/mpe/2017/3675459/>.

Mell et al., "The NIST Definition of Cloud Computing", National Institute of Standards and Technology, U.S. Department of Commerce, NIST Special Publication 800-145, Sep. 2011, 7 pages.

Raghuvanshi et al., "Development of new encryption system using Brownian motion based diffusion", Multimedia Tools and Applications (2021) 80:21011-21040, <https://link.springer.com/article/10.1007/s11042-021-10665-x>.

"Patent Cooperation Treaty PCT Notification of Transmittal of the International Search Report and the Written Opinion of the International Searching Authority, or the Declaration", Applicant's file reference IEE230052PCT, International application No. PCT/CN2023/082683, International filing date Mar. 21, 2023, Date of mailing May 19, 2023.

* cited by examiner

IMAGE ENCRYPTION

FIELD OF THE INVENTION

The disclosure relates generally to systems and methods for encrypting image data. The disclosure relates particularly to the use of a compressed latent space and a bounding box location as encryption/decryption key seeds.

BACKGROUND

Preventing unauthorized people from gaining access to the data stored in web-enabled computer systems is extremely difficult. All it takes is for a user to click on a malicious link in an email or respond unwarily to a seemingly legitimate request for information, and an intruder could gain complete access to all stored data. In regulatory and public relations environments, such a breach can be catastrophic.

Historically, encryption provided a way for businesses to keep data secure. Encryption encodes data so that only authorized parties can have access and focuses on controlling access to data rather than controlling the data itself. To achieve a higher level of data security, more restrictions around behavior would have to be set. But in today's mobile world, employees need to be able to transport files outside of the corporate network in order to travel and work from home efficiently. As a result, firms struggle with the conflict of being able to achieve data security while still maintaining a flexible and efficient work environment. Next generation data security has come about because of this challenge.

The basic idea of encryption converts data into a form in which the original meaning is masked, and only those who are properly authorized can decipher it. This is done by scrambling the information using mathematical functions based on a number called a key. An inverse process, using the same or a different key, is used to unscramble (or decrypt) the information. If the same key is used for both encryption and decryption, the process is said to be symmetric. If different keys are used the process is defined as asymmetric.

The definition is quite simple from the terms, encryption meaning the data or bits of any particular source are changed in a definite pattern which is known to only sender and receiver. This is generally done with normal bits of any passwords or Secure SSL encryption systems. But the concept of applying a similar encryption algorithm to an image creates a revolution in the field secret message transfer through images.

Image encryption works on the innovative idea of taking the consecutive or random pixel bits of an image and collectively modifying the pixel bits with logic, thereby leading to a complete set of new of pixels from the original bits. Giving rise to a new mode of information transfer.

Rivest-Shamir-Adleman (RSA) is a widely used encryption algorithm. The RSA algorithm is an asymmetric cryptography algorithm. Asymmetric actually means that it works on two different keys i.e., a Public Key and a Private Key. As the name describes that the Public Key is given to everyone, and Private key is kept private.

As an example of asymmetric cryptography: A client (for example browser) sends its public key to the server and requests for some data. The server encrypts the data using client's public key and sends the encrypted data. The Client receives this data and decrypts it using their private key. Since this is asymmetric, nobody else except browser can decrypt the data even if a third party has public key of browser.

Under RSA encryption, messages are encrypted with a code called a public key, which can be shared openly. Due to some distinct mathematical properties of the RSA algorithm, once a message has been encrypted with the public key, it can only be decrypted by another key, known as the private key. Each RSA user has a key pair consisting of their public and private keys. As the name suggests, the private key must be kept secret.

Public key encryption schemes differ from symmetric-key encryption, where both the encryption and decryption process use the same private key. These differences make public key encryption like RSA useful for communicating in situations where there has been no opportunity to safely distribute keys beforehand.

Object detection algorithms locate the presence of objects with a bounding box and types or classes of the located objects in an image. Algorithms produce a list of object categories present in the image along with an axis-aligned bounding boxes indicating the position and scale of every instance of each object category.

There are multiple top performing deep learning models which perform object localization and object detection such as R-CNN Models (R-CNN, Fast R-CNN, Faster R-CNN), and YOLO Models. The most popular family of object recognition models is referred to collectively as YOLO or "You-Only-Look-Once". The R-CNN models may be generally more accurate, yet the YOLO family of models are fast, much faster than R-CNN, achieving object detection in real-time. The approach involves a single neural network trained end to end that takes an image as input and predicts object bounding boxes and class labels for each bounding box directly.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable encryption of image data.

Aspects of the invention disclose methods, systems and computer readable media associated with image data encryption by receiving first image data corresponding to a first image having a first image size, compressing the first image data, yielding second image data corresponding to a second image having a second image size, augmenting the second image data yielding third image data corresponding to a third image having the first image size, determining coordinates of a location of the second image within the third image, encrypting the third image data according to the coordinates, providing the encrypted third image data to a decoder by a first communications channel, and providing the coordinates of the second image within the third image to the decoder by a second communications channel.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
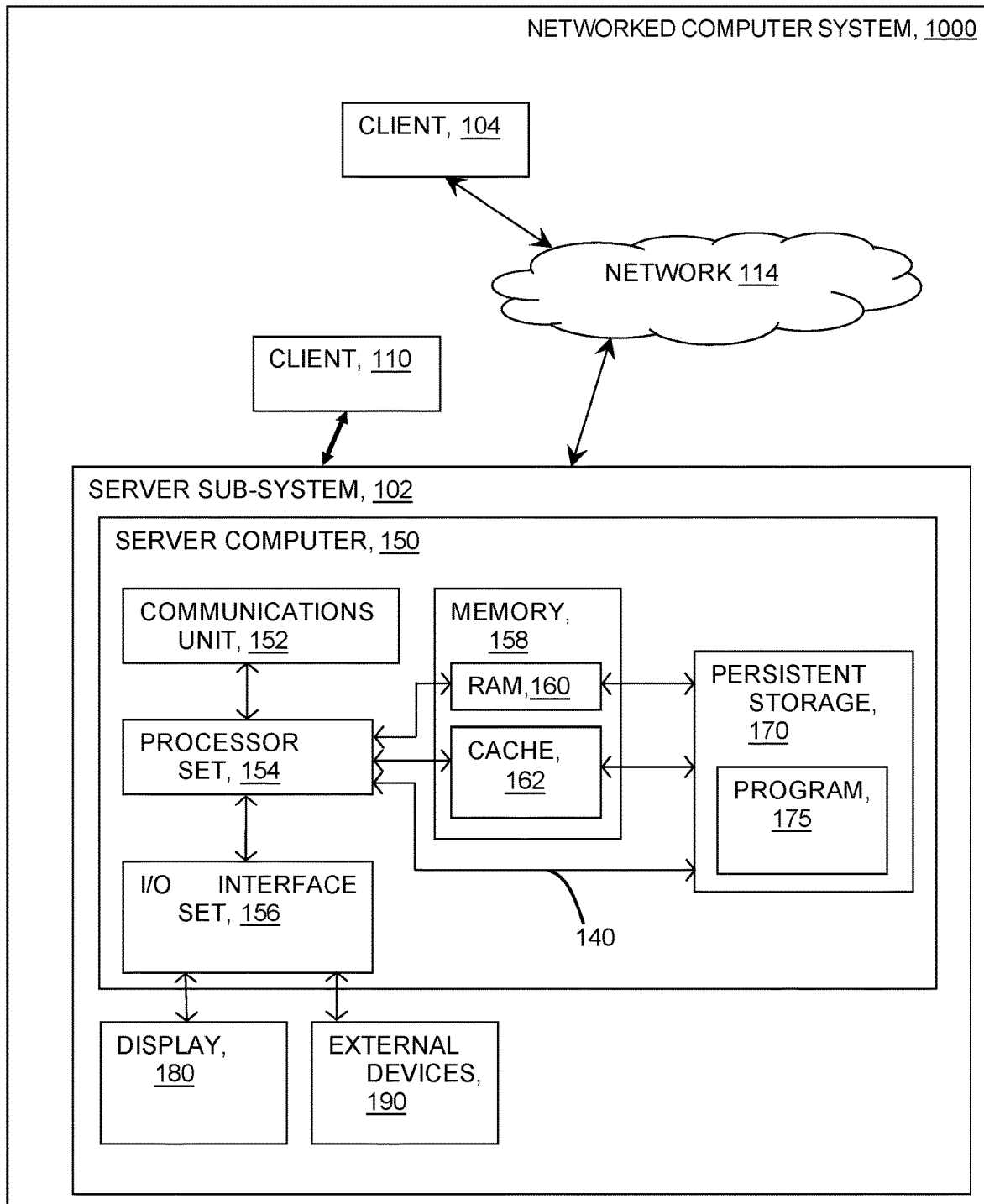
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Typical image encryption methods rely upon RSA encryption and chaotic encryption algorithms. RSA encryption has a public key that consists of two numbers where one number is multiplication of two large prime numbers. The private key is also derived from the same two prime numbers. Therefore, encryption strength totally lies on the key size and for doubled or tripled key size, the strength of encryption increases exponentially. RSA keys can be typically 1024 or 2048 bits long, 1024-bit keys may be susceptible to being broken in the near future.

The main disadvantage of the majority of chaotic encryption algorithms is the use of floating calculations which makes the practical software or hardware implementation of such systems not efficient, and complex compared to the traditional ciphers such as AES and RSA, which only operate with integer operations. Disclosed embodiments provide systems and methods requiring additional factors for encryption/decryption of image data.

Aspects of the present invention relate generally to the secure transfer of data using the encryption transfer and decryption of image date. In embodiments, a data transfer system receives unencrypted image data for an image of a first size. Compression of the image data yields an image of a reduced size. The method then augments the reduced image, padding out the dimensions of the reduced size image back to the original size, yielding an original size composite image including the compressed image and the augmenting data. A scan of the composite image yields the coordinates of the location of the compressed image within the composite image. In an embodiment, the system generates an encryption/decryption key pair using the coordinate obtained from the scan. Encryption of the composite image occurs using one key of the pair. The encrypted data passes to the intended recipient via a first communication channel. Transfer of the complementary key of the pair to the recipient occurs via a second communications channel such that interception of either the key or the data does not provide all the information necessary for decryption. In this manner, the recipient receives the data and the key, can decrypt the data and decompress the decrypted image, leading to possession of the full size decrypted original image.

In an embodiment, the system and method generate a single key from the bounding box coordinates and share the single key with the recipient as described above. In this embodiment, the encryption and decryption of the image data each utilize the same encryption key generated from the bounding box coordinate data.

In accordance with aspects of the invention there is a method for automatically receiving image data for encryption and transfer, the method compresses the received image data and augments the compressed image with random data to yield a composite image of the same size as the originally received image. The method scans the composite image, extracting location coordinates for the compressed image within the overall composite image. The method encrypts the composite image using the location coordinates as at least a part of the foundation for generation of the encryption key. The method passes a corresponding decryption key and the encrypted data file to a recipient using separate communications channels for each f the data file and the decryption key. The recipient utilizes the decryption key to decrypt the data file, then decompresses the decrypted file resulting in the original image.

Aspects of the invention provide an improvement in the technical field of data encryption and transfer systems. Conventional encryption systems utilize RSA or chaos-based encryption methods. Such methods may be vulnerable to being broken depending upon key size. Disclosed methods utilize a latent property of the original image in deriving the encryption/decryption key pair such that each encrypted image utilizes a unique key pair derived by processing the original data itself. Compression of the original image yields a smaller image which methods than pad out to the original size. An evaluation of the resulting image yields coordinates of the location of the compressed image within the boundaries of the composite image. An encryption key derived from these coordinates provides a means for encrypting the composite image data. A corresponding decryption key as well as the encrypted data file, pass to the recipient using independent communications channels. The recipient utilizes the decryption key to decrypt the data file, then decompresses the compressed image within the result, yielding the original image.

Aspects of the invention also provide an improvement to computer functionality. In particular implementations of the invention are directed to a specific improvement to the way encryption systems operate, embodied in the use of latent data from processing the original image data file through data compression, padding out the compressed result to the size of the uncompressed image, and isolating the coordinates of the compressed image within the original image, for use in deriving the encryption/decryption key(s) specific to the sharing of the original image. In embodiments, the system derives a new encryption/decryption key or key pair for each transferred image according to the location coordinates specific to each compressed—augmented image. In an embodiment, the method further processes the compressed image by generating a location for the compressed image within the boundaries of the original image prior to padding out the compressed image to those boundaries. In this embodiment, knowing the location of the compressed image in a previously encrypted and transferred file has no value as each image location differs. Utilization of unique key pairs for each image encryption—transfer-decryption sequence requires a malicious actor to acquire both the data file and the corresponding decryption key for any particular image transfer in order to decrypt the image.

As an overview, a data encryption system is an application executed on data processing hardware that utilizes an encryption methodology shared between a sender and a recipient. The data encryption system receives image data for encryption from various sources including input over a network. Compression of the image data yields a smaller compressed image which can then be padded out, using other data, to the original image size. An evaluation of the composite image yields location coordinates for the compressed image within the original sized image. These coordinates form the basis for generation of a key or a key pair. For a key pair, one key enables encryption of the composite image while the other key of the pair passes to the recipient for use in decrypting the encrypted file, also passed to the recipient albeit by a different communications channel. For a single key, the system passes the key to the intended recipient, and also uses the key for encrypting the data. The decrypted data may then be decompressed to yield the original image.

In an embodiment, one or more components of the system can employ hardware and/or software to solve problems that are highly technical in nature (e.g., receiving image data, generating a compressed image from the image data, padding the compressed image with augmented data, scanning the augmented image to determine coordinates of the compressed image within the augmented image, encrypting the augmented image according to a key generated using the coordinates, providing the coordinates-based key and the encrypted image to a recipient, etc.). These solutions are not abstract and cannot be performed as a set of mental acts by a human due to the processing capabilities needed to facilitate image data encryption, for example. Further, some of the processes performed may be performed by a specialized computer for carrying out defined tasks related to encryption and transfer of encrypted data. For example, a specialized computer can be employed to carry out tasks related to securely sharing confidential image data or the like.

In an embodiment, a method receives target confidential image data for sharing between a sender and a recipient. The confidential image data may be provided by the sender in any known digital image file format. In this embodiment, the method proceeds by compressing the confidential image data using known data compression methods such as DEFLATE, RUN-LENGTH, TRANSFORM, or other known image data compression models. (Note: the term(s) "DEFLATE, RUN-LENGTH, TRANSFORM", and "PuTTYGen" may be subject to trademark rights in various jurisdictions throughout the world and are used here only in reference to the products or services properly denominated by the marks to the extent that such trademark rights may exist.)

After compressing the confidential image data, the method generates random pixel data using for example, one or more random number generators to generate random values for pixel characteristics such as red, blue, green, hue, saturation, L*A*B* values, etc., and augments the compressed data with the generated random noise. In an embodiment, the method pads the compressed data such that the overall size of the composite image including the compressed data and the random data has the same size as the original, uncompressed, confidential image. In an embodiment, the method randomly selects a placement location for the compressed image within the boundaries of the original image and pads the space between the compressed image and the original image boundaries with the random pixel data. In this embodiment, the placement coordinates of each compressed image within the boundaries of the corresponding original image differ such that a recipient of a previous encryption process cannot utilize information regarding the location of the previous compressed image in decrypting any other encrypted image data.

In an embodiment, the method scans the composite image, including the compressed and augmented random data, using a method such as a You-Only-Look-Once (YOLO) model, a trained neutral network image analysis model such as a recurrent convolutional neural network (R-CNN, Fast R-CNN, Faster R-CNN), etc., to identify a bounding box, defined by coordinates, which defines the location of the compressed data within the random pixel data of the composite image. The scan outputs the coordinates of the bounding box surrounding the compressed data.

In an embodiment, the method utilizes the bounding box coordinates to generate a public-private key pair specific to the encryption and transfer of the current image data. In this embodiment, the method utilizes a key generation method such as PuTTYGen and the bounding box coordinates to generate the public-private key pair. In this embodiment, the method provides the recipient with the private key of the pair for use in decrypting the encrypted image data. The method transfers the private key using a first communications channel which differs from the communications channel intended for use in transferring the encrypted data. The use of separate communications channels for each of the key and the data decreases the likelihood that a malicious actor may intercept and utilize both the key and the data to gain access to the confidential data.

In an embodiment, the method generates a single encryption/decryption key for use with a symmetric encryption/decryption algorithm. In this embodiment, the method then provides the generated single key to the intended recipient for use decrypting the encrypted image data.

In an embodiment, the method encrypts the composite image using known encryption methods and an encryption/decryption key generated from the bounding box coordinates. Exemplary encryption methods include an asymmetric key encryption algorithm, a symmetric key encryption algorithm, RSA encryption, and ECC (elliptical curve cryptography methods. Following encryption, the method sends, or otherwise transfers, the encrypted data file to the recipient using a second communications channel as described above.

In an embodiment, upon receipt of both the decryption key and the encrypted data file, the recipient decrypts the file using a decryption algorithm and the provided decryption key, yielding the composite image including the compressed data and the random pixel padding. In this embodiment, the recipient extracts the compressed original image using the bounding box coordinates, or a new scan of the decrypted image to again identify the bounding box of the compressed image data. In this embodiment, the recipient then reverses the data compression algorithm using the compressed data as the input, yielding the original, uncompressed confidential image data.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise image encryption program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the image data encryption program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., image data encryption program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
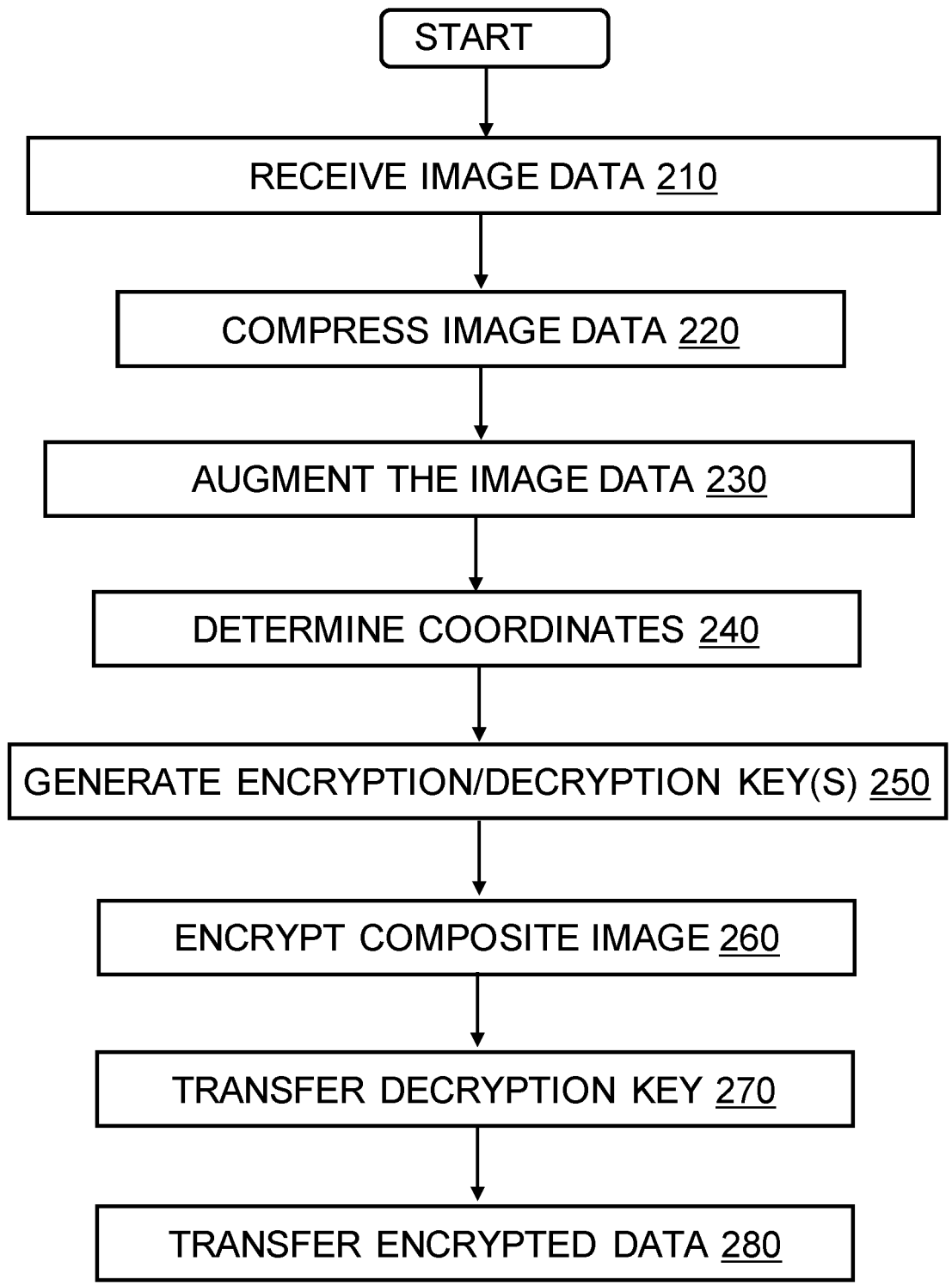
FIG. 2 provides a flowchart depicting an operational sequence, according to an embodiment of the invention.

FIG. 2 provides a flowchart 200, illustrating exemplary activities associated with the practice of the disclosure. After program start at block 210, the method receives an original image data file intended for encryption and transfer to a recipient, from a sender. At block 220, the method compresses the original data file, yielding a compressed image file, reduced in size relative to the original.

At block 230, the method augments the compressed data image, padding out the size of the image to the size of the original image using random pixel data, or other data. This augmentation or padding yields a composite image the same size as the original image with the compressed data embedded within the composite image. The location of the compressed image within the composite image may be set by the sender or randomly determined by the method.

At block 240, the method scans the data of the composite image using a bounding box object detection algorithm, such as a R-CNN trained to detect object bounding boxes, or a computationally more efficient YOLO model, to determine the location coordinates of a bounding box of the compressed data location within the composite image.

At block 250, the method generates an encryption/decryption key, or key pair, from the bounding box coordinates determined from the scan. The method utilizes known key generation algorithms to generate the key(s).

At block 260, the method encrypts the composite image utilizing an encryption algorithm and either the single generated encryption/decryption key or one key from the generated encryption/decryption key pair.

At block 270, the method transfers the encrypted composite image to the recipient using a communication channel and at block 280, the method transfers the associated decryption key to the recipient using a different communications channel. The method provides a mechanism whereby each image encrypted and transferred utilizes a unique key generated directly from a latent property of the composite image itself.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
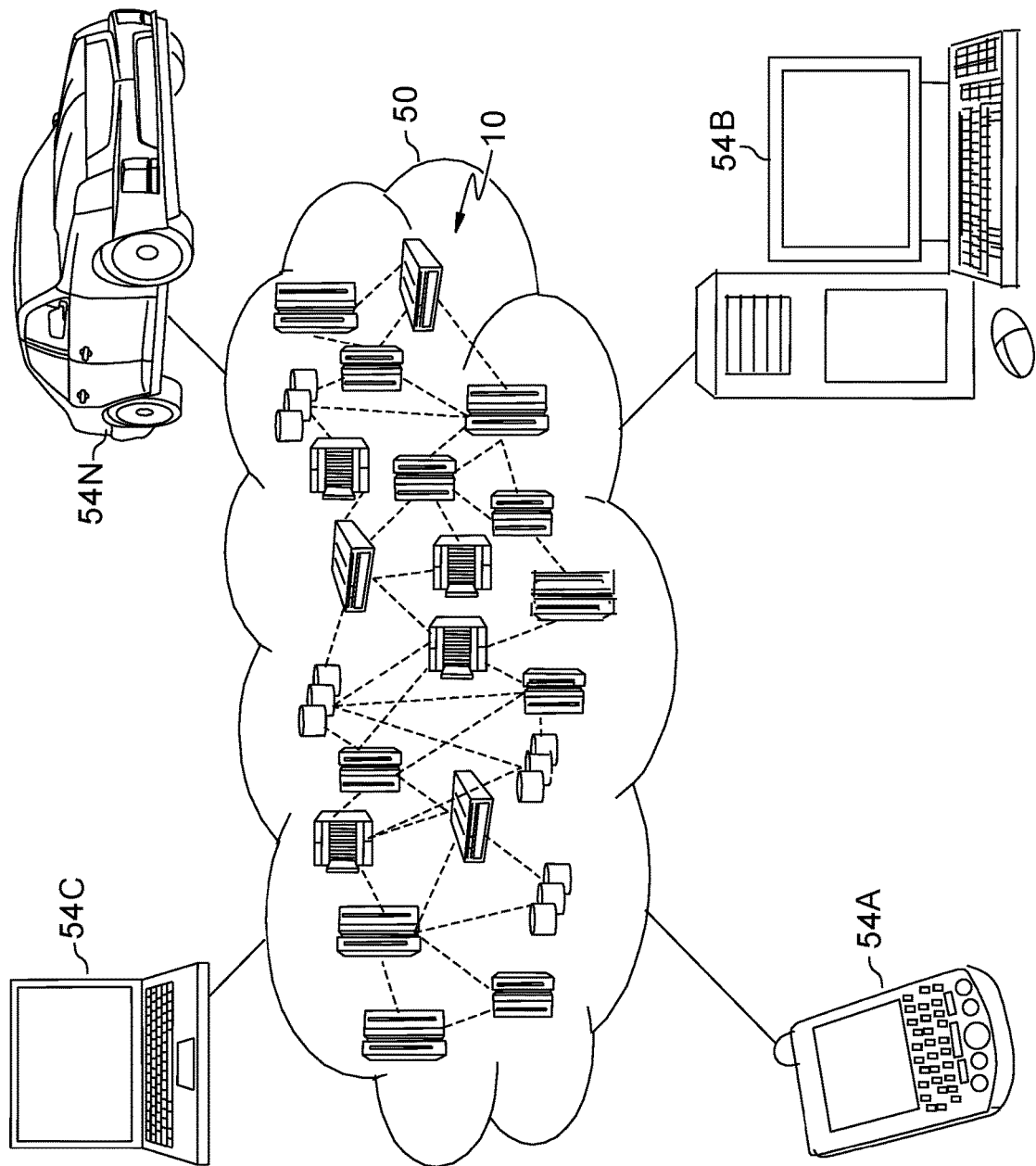
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services forwhich a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
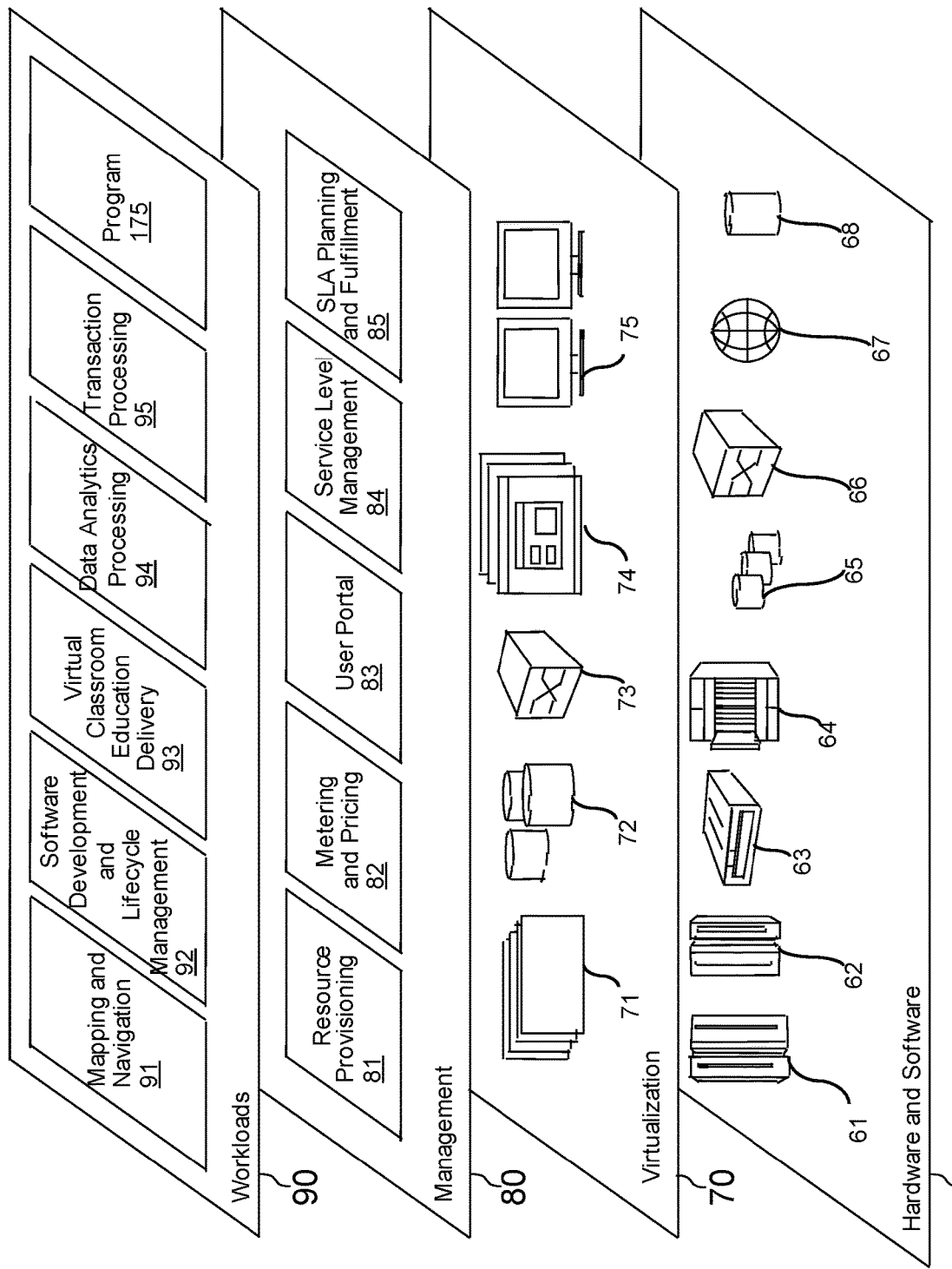
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image data encryption program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for image data encryption, the method comprising:
   receiving, by one or more computer processors, first image data corresponding to a first image having a first image size;
   compressing, by the one or more computer processors, the first image data, yielding second image data corresponding to a second image having a second image size;
   augmenting, by the one or more computer processors, the second image data yielding third image data corresponding to a third image having the first image size;
   determining, by the one or more computer processors, coordinates of a location of the second image within the third image;
   encrypting, by the one or more computer processors, the third image data according to the coordinates;
   providing, by the one or more computer processors, the encrypted third image data to a decoder by a first communications channel; and
   providing, by the one or more computer processors, the coordinates of the second image within the third image to the decoder by a second communications channel.

2. The computer implemented method according to claim 1, further comprising:
   determining, by the one or more computer processors, a placement location for the second image within the third image; and
   placing, by the one or more computer processors, the second image at the location.

3. The computer implemented method according to claim 1, wherein augmenting the second image comprises adding random image data.

4. The computer implemented method according to claim 1, further comprising
   decrypting, by the one or more computer processors, the third image according to the coordinates, yielding a decrypted image.

5. The computer implemented method according to claim 4, further comprising decompressing, by the one or more computer processors, the decrypted image.

6. The computer implemented method according to claim 1, further comprising generating, by the one or more computer processors, an encryption key using the coordinates.

7. The computer implemented method according to claim 1, wherein determining the coordinates of the second image within the third image further comprises determining the coordinates according to a you-only-look-once model.

8. A computer program product for encrypting image data, the computer program product comprising one or more computer readable storage devices and collectively stored program instructions on the one or more computer readable storage devices, the stored program instructions comprising instructions, which when executed, cause one or more processors to:
   receive first image data corresponding to a first image having a first image size;
   compress the first image data, yielding second image data corresponding to a second image having a second image size;
   augment the second image data yielding third image data corresponding to a third image having the first image size;
   determine coordinates of a location of the second image within the third image;
   encrypt the third image data according to the coordinates;
   provide the encrypted third image data to a decoder by a first communications channel; and
   provide the coordinates of the second image within the third image to the decoder by a second communications channel.

9. The computer program product according to claim 8, the stored program instructions further causing the one or more processors to determine a placement location for the second image within the third image; and place the second image at the location.

10. The computer program product according to claim 8, wherein augmenting the second image comprises adding random image data.

11. The computer program product according to claim 8, the stored program instructions further causing the one or more processors to decrypt the third image according to the coordinates, yielding a decrypted image.

12. The computer program product according to claim 11, the stored program instructions further causing the one or more processors to decompress at least a portion of the decrypted image.

13. The computer program product according to claim 8, the stored program instructions further causing the one or more processors to generate an encryption key using the coordinates.

14. The computer program product according to claim 8, wherein determining the coordinates of the second image within the third image further comprises determining the coordinates according to a you-only-look-once model.

15. A computer system for image data encryption, the computer system comprising:
- one or more computer processors;
- one or more computer readable storage devices; and
- stored program instructions on the one or more computer readable storage devices for execution by the one or more computer processors, the stored program instructions comprising instructions, which when executed, cause one or more processors to:
  - receive first image data corresponding to a first image having a first image size;
  - compress the first image data, yielding second image data corresponding to a second image having a second image size;
  - augment the second image data yielding third image data corresponding to a third image having the first image size;
  - determine coordinates of a location of the second image within the third image;
  - encrypt the third image data according to the coordinates;
  - provide the encrypted third image data to a decoder by a first communications channel; and
  - provide the coordinates of the second image within the third image to the decoder by a second communications channel.

16. The computer system according to claim 15, the stored program instructions further causing the one or more processors to determine a placement location for the second image within the third image; and place the second image at the location.

17. The computer system according to claim 15, wherein augmenting the second image comprises adding random image data.

18. The computer system according to claim 15, the stored program instructions further causing the one or more processors to decrypt the third image according to the coordinates, yielding a decrypted image.

19. The computer system according to claim 18, the stored program instructions further causing the one or more processors to decompress at least a portion of the decrypted image.

20. The computer system according to claim 15, the stored program instructions further causing the one or more processors to generate an encryption key using the coordinates.

* * * * *